Sept. 24, 1957   D. M. GALLOP   2,807,221
MOLD FOR PLASTIC FOOD MATERIALS
Filed April 11, 1956

INVENTOR.
DWIGHT M. GALLOP
BY
ATTORNEY

United States Patent Office 2,807,221
Patented Sept. 24, 1957

2,807,221

MOLD FOR PLASTIC FOOD MATERIALS

Dwight M. Gallop, Wichita, Kans.

Application April 11, 1956, Serial No. 577,560

3 Claims. (Cl. 107—15)

This invention relates to food. In a more specific aspect this invention relates to food materials which are plastic and can be molded into cake form. In a still more specific aspect this invention relates to mold means, and more specifically to a mold structure which will make a relatively flat cake of plastic food material from a ball or lump of same.

Plastic food material is often formed into cakes or patties and cooked by frying, broiling, baking, etc., such plastic food materials as ground beef commonly called hamburger, ground pork commonly called sausage when mixed with seasoning and other materials, ground fish with various vegetable materials mixed therewith, and the like. Hand forming of the cake to cook is unsatisfactory and messy, usually giving a cake which will not stay together unless undue hand kneading of the food material is done. And, such hand forming can in many cases be unsanitary. Also, mold means is known in the art which will form the cakes or patties, but such do not work very well, merely pressing a ball or lump of the plastic food material out into a relatively flat cake without kneading the ball or lump so that it will stay together during cooking.

I have invented new mold means for forming plastic food material, such as those set forth hereinbefore, into cakes or patties which forms a relatively flat cake from a lump or ball of same, and which kneads the material during forming or molding to give a well formed cake which will hold together during handling, cooking, and serving.

The new mold of my invention for plastic food materials has a shell open at one end. A paddle is mounted on said shell for rotation therein, and this paddle slides in and out in relation to the shell. The paddle shape and structure is a very important and advantageous part of my invention. It is elongated and of operating length substantially that of the distance across the shell. The paddle has a convex side with this convex side toward the open end of the shell from which the formed or molded food cake is taken, and this convex side contacts the food material lump or ball during the forming or molding, during which the lump or ball, which is within the shell and against a surface closing the open end of the shell, is kneaded by the paddle and pressed into a cake as the paddle is rotated.

It is an object of my invention to provide new means to handle food.

It is another object of my invention to provide new means for forming or molding plastic food materials in cakes for subsequent cooking.

It is still another object of this invention to provide new mold means for forming plastic food material into cakes from a ball or lump of same, such mold means kneading the food material during molding to form a firm stable cake which will not fall apart during handling, cooking and serving.

Other objects and advantages of the new mold means of my invention will become apparent to those skilled in the art upon reading this disclosure.

Drawings accompany and are a part of this disclosure. The drawings depict preferred specific embodiments of the new mold means of my invention and it is to be understood that such drawings are not to unduly limit the scope of my invention.

In the drawings, Fig. 1 is a perspective view of a preferred specific embodiment of the new mold means of my invention.

Figure 1:
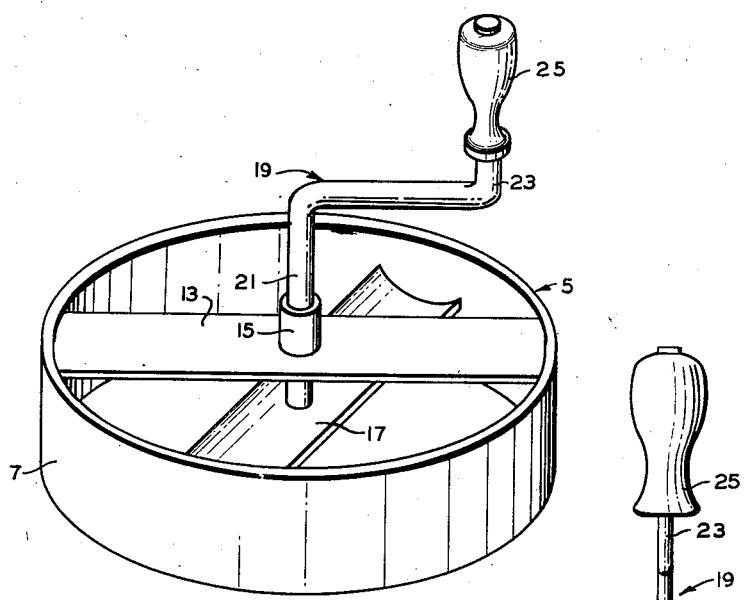
Figure 2:
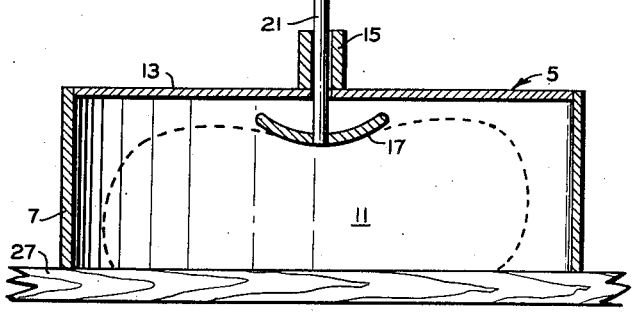
Fig. 2 is a cross-sectional elevation view through the means of Fig. 1 transverse to the paddle of the mold means.
Figure 3:
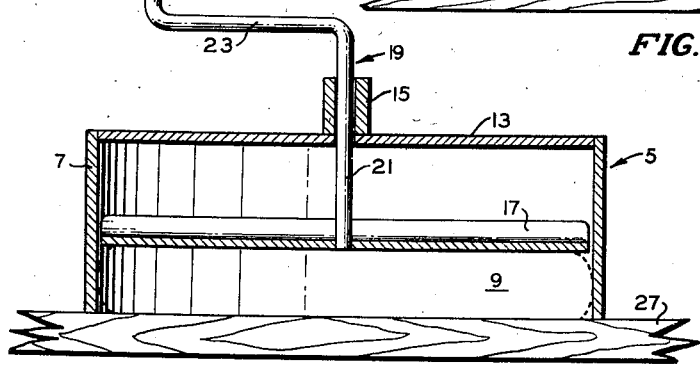
Fig. 3 is a cross-sectional elevation view through the mold longitudinal to the paddle.

Following is a discussion and description of the new mold means of my invention made with reference to the drawings whereon the same reference numerals are used to indicate the same parts or structure. The discussion and description is of preferred specific embodiments of the new mold of my invention, and it is to be understood that such is not to unduly limit the scope of my invention.

The mold 5 has a hollow cylindrical housing or shell 7 which is wide open at the bottom so that cake 9 of the plastic food material can be withdrawn therefrom after being formed from a ball 11 of same. The shell 7 is preferably made of metal, wood or moldable plastic material, and the like, and is preferably braced on top by transverse member 13 attached thereto, which can conveniently be made of the same material. Bearing 15 is mounted on brace 13 in any suitable manner, such as by welding bearing 15 to brace 13. A paddle 17 is attached to an operating crank member 19 therefore in any suitable manner such as by welding. This crank member 19 has a shank portion 21 rotatably and slidably mounted in bearing 15 and a corresponding hole in brace 13. Integral therewith is a crank portion 23 having a handle 25 preferably swivelly mounted thereon. Turning crank 19 by holding handle 25 in the fingers turns paddle 17 within shell 7. Paddle 17 is preferably elongated as shown and approximately the length of the diameter of shell 7.

The mold 5 is used on a flat surface, for example, a wooden board 27, preferably with a piece of waxed paper (not shown), or the like, thereon to receive the formed meat cake or pattie 9. A ball or lump 11 of the hamburger, sausage, or the like, is placed on the work board 27, and then the mold is placed therearound with the ball or lump 11 within shell 7. Paddle 17 in contact with the ground meat is turned by crank 19 and handle 25, and pressure is applied to force paddle 17 downwardly. This operation is carried on until the relatively flat cake 9 is formed. The mold is then lifted from cake 9 which is ready for use or storage. The new mold of my invention gives a very good cake 9 since the ground meat is kneaded by paddle 17 as the cake is being formed. The specific shape of paddle 17 with its convex lower side accounts for this action during forming and gives the good results achieved. Meat patties are made very rapidly by my new mold, making it very economical to use in commercial operations.

As will be evident to those skilled in the art, various modifications of this invention can be made, or followed, in the light of this disclosure and discussion, without departing from the spirit or scope of the disclosure or from the scope of the claims.

I claim:

1. A mold for plastic food material, comprising, in combination, a shallow, cylindrical shell wide open in its lower end, a bearing centrally mounted at the upper end of said shell and means attached to said shell to mount said bearing, a shaft having a lower shank portion rotatably and slidably journaled in said bearing coaxially with said cylindrical shell and an upper integral crank portion with a handle swivelly mounted on the outer end portion thereof and adapted to turn said shank portion of said shaft, and a paddle mounted on the lower end of said shaft to turn therewith within said shell, said paddle being rectangular, of length substantially that of the diameter of said shell, concavo-convex when viewed in transverse cross section and straight when viewed in longitudinal cross section and mounted with the convex side downward, said mold being adapted to form a substantially round, flat cake of said plastic food material from a ball of same placed on a flat surface within said shell and rotating said paddle with said convex side in contact with said ball by said crank while pressing down on said paddle.

2. A mold for plastic food materials, comprising, in combination, a cylindrical shell open in one end portion, bearing means mounted in the other end portion, a shank slidably journaled in said bearing means, said shank having crank means on its outer portion adapted to turn same and a paddle mounted on its inner portion adapted to rotate within said shell with said shank, said paddle being elongated, of length substantially that of the diameter of said shell, concavo-convex when viewed in transverse cross section and straight when viewed in longitudinal cross section and mounted with the convex side toward said first-named end portion of said shell, and said mold being adapted to form a substantially round, flat cake of said plastic food material from a ball of same upon placing said shell over said ball and rotating said paddle with said convex side in contact with said ball while pressing said paddle against said ball.

3. A mold for plastic food materials, comprising, in combination, a shell open at one end, and a paddle mounted on said shell for rotation therein and in slidable relation thereto, said paddle being elongated, of operating length substantially that of the distance across said shell and having a convex side when viewed in transverse cross section and with such side toward said opened end of said shell, and said mold being operative to make a relatively flat cake of said plastic food material from a ball of same upon rotating said paddle with said convex side in contact with said ball while pressing said paddle against said ball.

References Cited in the file of this patent

UNITED STATES PATENTS

| | | |
|---|---|---|
| 1,799,827 | Lawrence | Apr. 7, 1931 |
| 2,150,659 | Santo | Mar. 14, 1939 |